United States Patent [19]

Hahn

[11] Patent Number: 4,605,873
[45] Date of Patent: Aug. 12, 1986

[54] ELECTROMECHANICAL MACHINE

[75] Inventor: James H. Hahn, Lakeland, Fla.

[73] Assignee: David H. Rush, Hollywood, Fla.

[21] Appl. No.: 397,480

[22] Filed: Jul. 12, 1982

Related U.S. Application Data

[63] Continuation-in-part of Ser. No. 334,303, Dec. 24, 1981, which is a continuation of Ser. No. 22,422, Mar. 21, 1979, abandoned.

[51] Int. Cl.[4] .................................. H02K 21/76
[52] U.S. Cl. ................................... 310/154; 310/268
[58] Field of Search ............... 310/154, 268, 181, 156, 310/152, 43, 78

[56] References Cited

U.S. PATENT DOCUMENTS

| 444,067 | 1/1891 | Holcombe | 310/268 X |
|---|---|---|---|
| 2,847,589 | 8/1958 | Haydon | 310/268 X |
| 3,230,406 | 1/1966 | Henry-Baudot | 310/268 X |
| 3,293,466 | 12/1966 | Henry-Baudot | 310/268 X |
| 3,324,321 | 6/1967 | Kober | 310/268 X |
| 3,469,137 | 9/1969 | Huhta-Koivisto | 310/178 |
| 3,482,131 | 12/1969 | Lytle | 310/268 X |
| 3,497,739 | 2/1970 | Appleton | 310/268 X |
| 3,906,267 | 9/1975 | Coupin et al. | 310/268 X |
| 3,997,806 | 12/1976 | Noto | 310/268 |
| 4,390,805 | 6/1983 | Hahn | 310/268 X |

Primary Examiner—Donovan F. Duggan
Attorney, Agent, or Firm—Darby & Darby

[57] ABSTRACT

An electromechanical machine is disclosed which comprises a field producing assembly mounted in a housing so as to define an air gap circumferentially disposed about an axis of rotation. The field assembly is structured to produce a distribution of magnetic flux in the air gap having P periodic extremes of flux density about the axis. An armature is positioned in the air gap, and mounted so that the armature and field assembly are rotatable relative to each other. The armature has a circular array of C non-overlapping coils on each of its front and back faces, the coils on one face being angularly offset from the coils on the other face and each having the same arcuate extent, smaller than 360 degrees divided by P.

74 Claims, 7 Drawing Figures

ELECTROMECHANICAL MACHINE

This is a continuation-in-part of application Ser. No. 334,303 filed Dec. 24, 1981, which is a continuation of application Ser. No. 22,422, filed Mar. 21, 1979, which was abandoned on Jan. 16, 1982.

BACKGROUND OF THE INVENTION

The present invention relates generally to electromechanical machinery, and more particularly, to such machinery utilizing a disc-type armature.

Electrical rotating machines, such as motors or generators utilizing disc-type armatures, are well-known in the art. Such machines, utilizing wires conventionally wound in laminated or shingle-lapped fashion on the disc armatures, are frequently unsatisfactory in that the armatures are undesirably bulky and irregular winding arrangements are required. Arrangement of the wires conventionally into a suitable winding pattern usually takes the form of a crossover of wires, thereby resulting in a large air-gap between field members and a consequential reduction of flux in the gap, which lowers the effectiveness of the machine.

To overcome these disadvantages, printed circuit-type machines have been used in which a conductive pattern is etched or printed to form the armature winding. An example of a printed disc armature is disclosed in my earlier U.S. Pat. No. 3,096,455 issued on July 2, 1963. This type of motor provides a number of advantages. For example, such machines exhibit virtually no magnetic flux distortion or eddy current induction. The printed circuit armature machines are further advantageous in that they may include a large number of poles without increasing eddy loss and while increasing the back e.m.f. These machines, however, suffer from the disadvantage that, when fabricating a high-power machine, the necessary increase in thickness of copper winding is difficult to accomplish with customary printed circuit techniques. Furthermore, the limitations of such techniques are such that there is a minimum obtainable separation between turns in the winding which limits the number of turns of wire which can be provided in a given area. In addition, customary etching techniques require thin metal conductors, and this increases the resistance of the armature winding. The combination of relatively few turns in a given area with relatively high armature resistance results, of course, in a machine of relatively low power.

Some disc-type machines employ a single layer of conductor winding to form the armature between an opposing pair of field members, such as shown in British Pat. No. 1,299,057 issued on Dec. 6, 1972, to Kollmorgen Corporation. Such machines are usually characterized by relatively low power and efficiency. U.S. Pat. No. 2,847,589 issued on Aug. 12, 1958, to A. W. Haydon shows another version of a disc-type machine wherein the coils are wound in flat spirals on both sides of an insulated disc. This type of arrangement produces a relatively low power machine due to the small number of coil turns per field pole and the low density of copper winding in relation to gap thickness. Other known arragements can boost the efficiency of small disc-type machines to as high as 75 to 80% by using high-strength alnico or rare earth magnets, but these types of magnets are very costly and increasingly scarce due to shortages in the supply of the constituent elements. High efficiencies of up to 90% may be achieved in large, high-power lamination-type motors, but these motors are typically of the order of several hundred pounds in weight and deliver relatively low power in proportion to their weight.

Another characteristic of conventional disc-type machines has been the use of alternating north and south magnets in the field assembly to provide a corresponding number of field poles in the air gap between an opposing pair of field members. In many cases, this construction results in a substantial amount of flux leakage between adjacent oppositely-polarized magnets, thereby reducing the effective magnet surface area which can be obtained from an annular magnet of a given diameter.

It has been found, especially in the case of low energy ferrite based magnets, that the flux density at the poles of a magnet does not increase substantially when the thickness of the magnet is increased beyond a certain point (approximately $\frac{1}{4}''$ to $\frac{3}{8}''$ in ferrite magnets). After this point is reached, the only practical way to obtain more flux from the magnet is to increase the surface area of the pole. In the case of disc-type machines, this requires a larger diameter with a larger housing, thus presenting an upper limit to the efficiency of such machines with a given diameter. Furthermore, since the amount of flux leakage in a field assembly of alternating north/south pole construction increases with the number of poles, the diameter of such a machine further limits the number of poles which can effectively be used in the field assembly, resulting in lower induced e.m.f. in the armature coils and reduced efficiency.

U.S. Pat. No. 3,906,267 to Coupin et al, issued on Sept. 16, 1975, describes a machine which relieves some of these flux leakage problems by positioning a high strength, cylindrical, axially magnetized Alnico or rare earth magnet between two ferromagnetic side "cheeks", each having a number of teeth of like polarity. The teeth of each cheek extend radially outwardly from the ends of the magnet and are juxtaposed to the teeth from the other cheek, forming an annular air gap normal to the machine axis and encircling the cylindrical surface of the magnet, in which a stationary disc armature is positioned. The regions of the gap between pairs of aligned teeth thus have high concentrations of magnetic flux density, all with the same polarity, while the intermediate regions of the gap have relatively low flux density. The transition from a maximum extreme to a minimum extreme of flux density produces substantially the same effect as the transition from a north pole to a south pole in a conventional field assembly, while alleviating the problem of flux leakage between adjacent north and south poles. As an armature coil is moved through the gap, an e.m.f. is induced in the coil due to the changing flux density, although the direction of magnetic flux passing through the armature remains constant.

However, the field assembly in Coupin has a number of disadvantages which limit its potential usefulness especially with commonly available low-energy magnets of reasonable cost, such as barium or strontium ferrite. While these magnets may provide a sufficient field for such a machine to operate, the field strength in the air gap would be very low since the magnet's polar surface area is much smaller than the housing size. Thus, for a given machine size, the Coupin design would be impractical to use with low energy magnets, which are much less expensive and more readily available than the high-energy magnets used in Coupin.

Another factor which limits the field strength in Coupin is the presence of stray flux lines in between adjacent regions of high flux density in the gap. Since the e.m.f. induced in a coil is a function of the rate of change of flux lines through the coil, the greatest e.m.f. will be induced when the magnetic field between adjacent regions of high flux density falls as close to zero as possible. Thus, the efficiency of a machine having a uniform polarity magnetic field would be enhanced by a field assembly which is designed to substantially eliminate stray flux lines in between high flux density regions of the gap.

It is, therefore, an important object of the present invention to provide an improved electromechanical machine in which the drawbacks and disadvantages mentioned above are avoided or minimized.

It is a further object of the invention to provide such a machine characterized by low weight, high power, and high efficiency, which may be of the order of 90% or greater.

It is yet another object of this invention to provide an electromechanical machine which is characterized by substantially negligible distortion in its magnetic field and eddy losses, and zero induction in the coils when shorted upon alignment with the stator poles, whereby a machine of high speed, power, and efficiency is attainable.

It is still another object of the invention to provide an electromechanical machine having a coreless disc-type rotor in which the armature coils on one face of the rotor are offset from and connected in a simple manner with the coils on the other face, the coils of the two faces being connected to a commutator such that the machine has high efficiency, smooth torque characteristics, and long brush life.

It is yet a further object of the invention to provide a field assembly for a disc-type electromechanical machine which provides increased field strength for a given diameter housing.

It is a further object to provide such a field assembly which substantially eliminates flux leakage between adjacent poles.

It is still another object to provide such a field assembly which may be advantageously constructed with low-cost ferrite-based magnets.

It is yet another object to provide a field assembly utilizing a uniform polarity magnet structure in which stray flux in the air gap is substantially eliminated.

SUMMARY OF THE INVENTION

In accordance with one aspect of the invention, an electromechanical machine is provided which comprises a field producing assembly mounted in a housing so as to define an air gap circumferentially disposed about an axs of rotation. The field assembly is structured to produce a distribution of magnetic flux in the air gap having P periodic extremes of flux density about the axis. An armature is positioned in the air gap, and mounted so that the armature and field assembly are rotatable relative to each other. The armature has a circular array of C non-overlapping coils on each of its front and back faces, the coils on one face being angularly offset from the coils on the other face and each having the same arcuate extent, smaller than 360 degrees divided by P.

In a preferred embodiment of the invention, each of the 2C coils on the armature is electrically connected to its adjacent coils in head-to-tail fashion. A commutator having 2C conductive segments is mounted in fixed relation with respect to the armature, each of the armature coils being connected between a pair of adjacent commutator segments. P brushes are positioned about the commutator, each of the brushes being wide enough to bridge a pair of adjacent commutator segments. The brushes are positioned with respect to the field assembly so that when a coil is aligned with an extreme of flux density it is short circuited by a brush, the other coils being in series circuit between adjacent brushes.

In another aspect of the invention, an electromechanical machine is provided in which a magnet structure having an annular face produces a magnetic field having uniform polarity over all of the annular face. First and second magnetic flux concentrating members are arranged on a common axis with the annular face and are spaced axially apart to form a gap. The first and second flux concentrating members cooperate to collect the flux from substantially the entire surface area of the annular magnet face and concentrate that flux in discrete arcuate regions of the gap. The annular face of the magnet structure is juxtaposed to one of the flux concentrating members on the side of that member opposite from the gap, that flux concentrating member comprising a low reluctance member substantially conforming to the annular face of the magnet structure. At least one of the flux concentrating members has a plurality of salient pole pieces arranged in a circular array about the axis, the pole pieces extending axially toward the other one of the flux concentrating members, and defining a corresponding plurality of high flux density regions in the gap. An armature is positioned between the first and second flux concentrating members in the gap, the armature comprising a plurality of coils arranged in a circular array about the machine's axis.

In yet another aspect of the invention, an electromechanical machine is provided having first and second magnetic flux concentrating members coaxially positioned about a rotational axis and spaced apart to form a gap. The first flux concentrating member has a plurality of first salient pole pieces of like magnetic polarity arranged in a circular array about the axis and extending axially toward the second flux concentrating member. Each of the pole pieces defines a region of maximum flux density in the gap at the pole piece's arcuate midpoint, and a trough between adjacent pole pieces defines a region of minimum flux density in the gap at the trough's arcuate midpoint. Each pole piece has a circumferentially tapered side wall extending over at least a portion of the arc sector between its midpoint and the midpoint of an adjacent trough to reduce the level of stray flux lines in the vicinity of the troughs ' arcuate midpoint. An armature is interposed between the first and second flux concentrating members in the gap, the armature comprising a plurality of coils arranged in a circular array about the axis.

In still another aspect of the invention, first and second flux concentrating members are coaxially arranged about a rotational axis and spaced apart to form a gap. The first and second flux concentrating members respectively include first and second sets of opposed salient pole pieces in a circular array about the axis, all of the pole pieces of a given set having the same magnetic polarity opposite to that of the other set of pole pieces. The dimensions of the pole pieces are such that the arcuate extent of a second pole piece is substantially greater than that of its corresponding first pole piece, so that magnetic flux emanating from the first pole piece is substantially confined within the arcuate extent of the second pole piece, thus providing a negligible level of stray flux in the region between adjacent second pole pieces.

BRIEF DESCRIPTION OF THE DRAWINGS

The foregoing and other objects and features of the present invention will be more clearly understood from the following detailed description when read in conjunction with the accompanying drawings in which.

DESCRIPTION OF PREFERRED EMBODIMENTS

Figure 1:
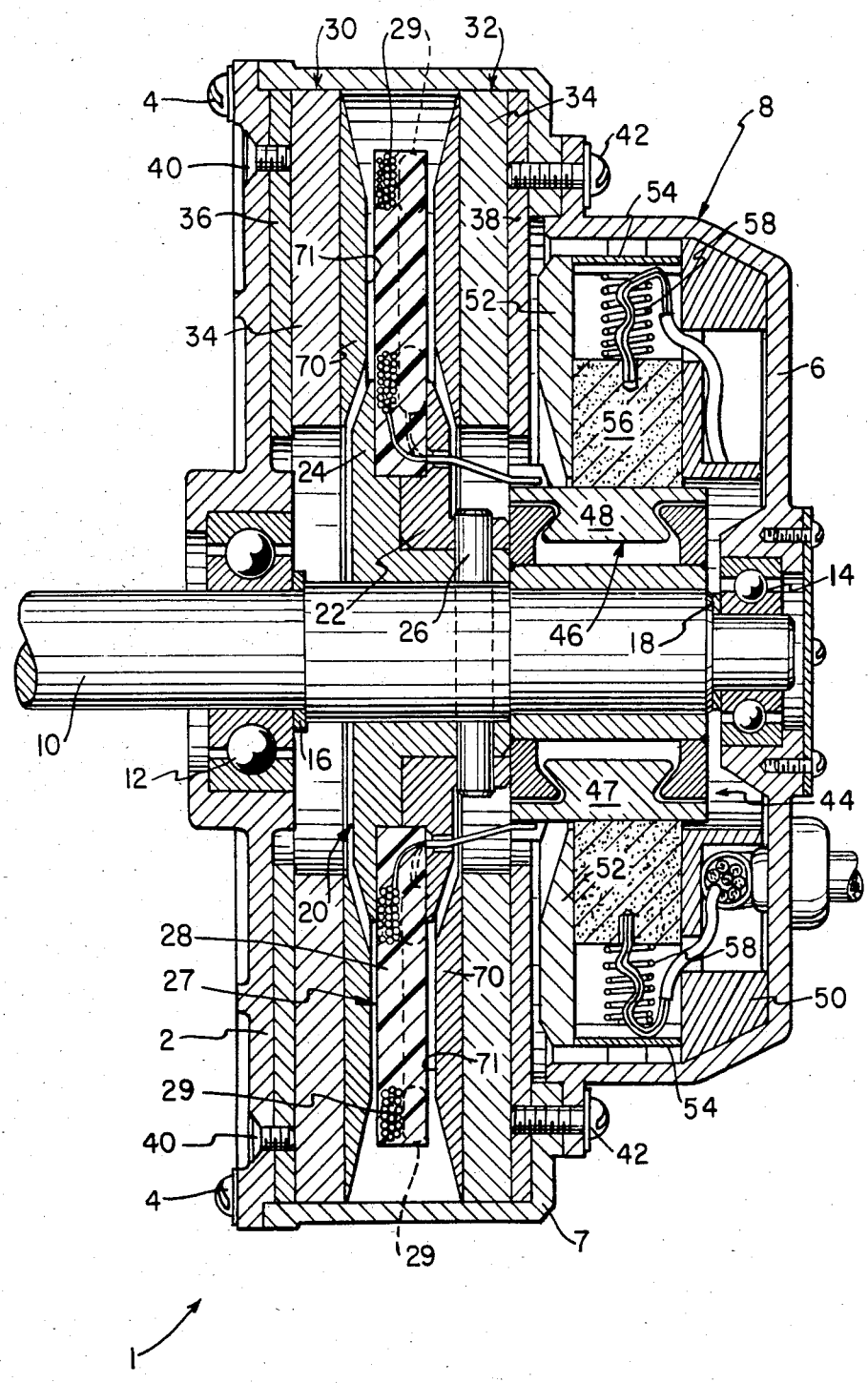
FIG. 1 is an axial cross-sectional view of an electromechanical machine according to the invention.

Turning now to FIG. 1, there is illustrated a cross-sectional view of an electromechanical machine 1 utilizing a coreless disc-type armature. A housing secion 2 is connected by any conventional means, for example screws, one of which is indicated at 4, to other housing sections 6 and 7 to form the machine housing indicated generally at 8. Rotatably mounted within the housing 8 by means of front bearings 12 and rear bearings 14 is a shaft 10. Washers 16 and 18 may be positioned between the shaft 10 and the front and rear bearings, respectively. Within the housing 8 and mounted about the shaft 10 is an armature hub indicated generally at 20 which includes hub-section 22 and hub-section 24. The hub-sections 22 and 24 are preferably constructed of aluminum or other lightweight, non-magnetic material. They are connected to one another and to the shaft so as to rotate therewith, as by a roll pin 26 passing through the two hub-sections and the shaft 10. Suitably secured between the two hub-sections 22 and 24 to rotate therewith is an annular armature, indicated generally at 27, which includes a disc shaped rotor 28 made of a non-conducting, non-magnetic material such as, for example, a phenolic. Secured to the rotor 28 as by adhesive or molding or the like are a plurality of conducting wires forming armature coils 29, which will be more fully described below.

Machine housing 8 includes a field assembly comprising first and second magnetic field members, indicated at 30 and 32, which are arranged parallel and spaced apart by a narrow gap. Each of the field members 30 and 32 preferably includes a plurality of flat pie-segment-shaped permanent magnets, indicated at 34, which may, for example, be constructed of relatively inexpensive and lightweight ceramic ferrite. Each of the permanent magnets 34 is magnetized through its thickness, so one face is of one polarity and the other face of opposite polarity. The magnets may be fixedly secured by means of an elastic cement, for example, to a ferromagnetic support plate in the form of a ring made of soft iron or steel, the two support plates being indicated at 36 and 38, respectively. The two support plates 36, 38 are fixedly connected to the housing 8 by any conventional means, for example by screws, indicated at 40 and 42, respectively. Alternatively, the field members 30 and 32 may be formed of ceramic ferrite discs, suitably magnetized at salient areas to form the field poles.

Figure 5:
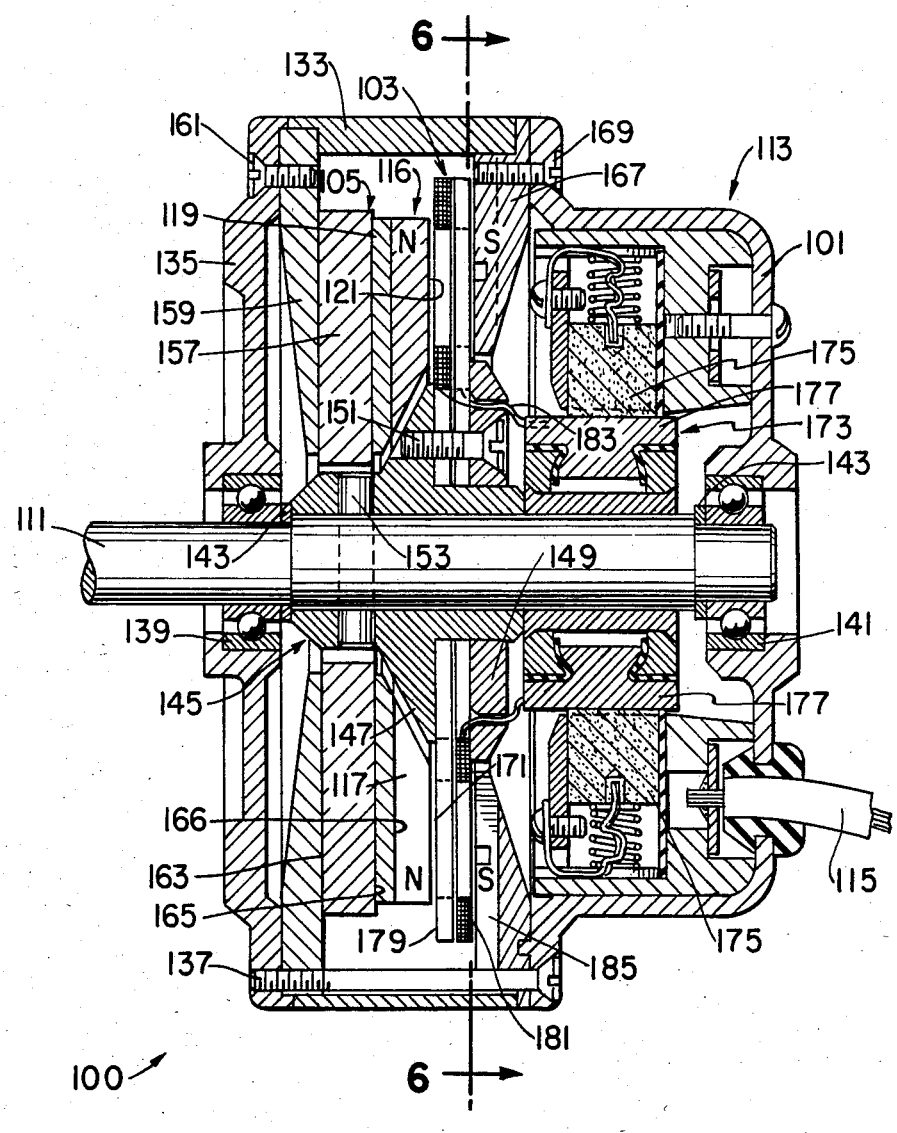
FIG. 5 is an axial cross-sectional view of the electromechanical machine of FIG. 4, taken along section line 5—5.

As defined in this specification, a field member is a structure disposed about the machine's axis on one side of armature 27, which forms part of the machine's magnetic circuit and which is juxtaposed to a corresponding field member to form the air gap in which the armature is situated. While each of the field members 30 and 32 of the embodiment being discussed includes a permanent magnet 34, those skilled in the art will appreciate that this is not required in order to form a suitably distributed flux field in the gap between the field members. For example, a field member may be formed entirely of ferromagnetic material, so long as it provides a low reluctance path through which magnetic flux crossing the air gap may return to its source. An illustration of such an embodiment is seen in FIG. 5, which will be discussed in greater detail later in this specification.

The field assembly discussed above permits the use of a large number of magnetic field poles, for example 6, 8, 10 or more. For a given rotor diameter, gap thickness, rotating speed, and number of coil turns, a greater number of field poles will result in greater e.m.f. as lines of force are cut faster. In order to reduce flux leakage between adjacent north and south poles, it is preferable to provide some separation between adjacent magnets 34, resulting in slightly reduced total magnetic area with a greater number of poles. In larger machines, 10 or 12 field poles may be used with an overall gain in e.m.f. Furthermore, the greater number of poles provides an increased safety factor against the demagnetizing effect of the armature field.

In a preferred example, the field pole magnets 34 are made of ceramic ferrite permanent magnets, since the higher magnetic strength alnico or rare earth magnets are very expensive and subject to shortages in supply. The individual magnets 34 are in pie-segment-shaped sections so that the magnetic surface area of each is maximized. On each ceramic magnet face is cemented a flat ferromagnetic face piece 70, preferably soft iron or steel, having at its inward face the same shape and area as the ceramic magnet face to which it is mated. Each face piece 70 is preferably tapered to provide an outward face 71 of an area approximately 40 to 50% of the inward face area, while matching the underlying ceramic magnet section as to circumferential width. This arrangement permits concentration of the magnetic flux to near-saturation and reduction of the corresponding armature diameter without loss in e.m.f., which results in less windage, shorter wire length per coil, and, accordingly, less resistance and an increase in power and efficiency.

It is also possible to utilize a continuous ring of ceramic ferrite, magnetizing adjacent sections in alternate polarity, thereby further increasing the magnet area. However, this is less desirable since such a continuous ceramic ferrite structure is frangible and subject to breakage, even when adhered by means of an elastic cement to the magnetic back-up ring. Individual pie-segment-shaped magnets are preferred since there is little reduction in total magnet area and substantial reduction in the likelihood of breakage.

Fixedly connected to the shaft 10 in FIG. 1 and rotating with it is a commutator indicated generally at 44. The commutator 44 includes a plurality of segments or bars 46 of a conductive material, such as copper, suitably insulated from one another by, for example, mica. The commutator is also electrically insulated from the armature shaft 10 on which it is mounted. Two of the copper bars of the commutator are indicated at 47 and 48. Fixed to the rear housing section 6 is a brush holder mount 50 to which is attached a brush holder 52 and a brush-holder clip 54. A brush 56 is positioned between the brush holder 52 and the brush-holder clip 54 and is maintained in electrical contact with the various commutator bars under it by a spring 58 positioned between the brush 56 and the brush-holder clip 54. Other brushes, as needed, are similarly mounted in relation to the commutator.

Figure 2:
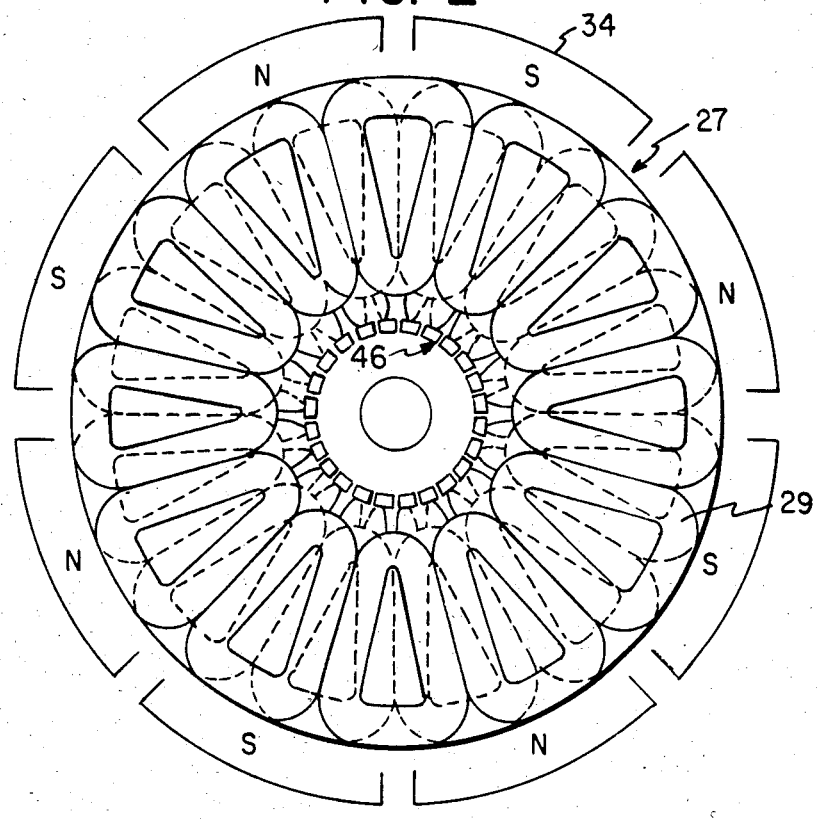
FIG. 2 a plan view of one face of an 8-pole, 24-coil disc armature wound according to the invention with the coils of the other face shown in dashed lines.

Turning now to FIG. 2, the winding pattern for one side of an 8-pole, 24-coil armature 27 is illustrated in relation to the magnets 34 of the field member 32, with the coils on the other side of the armature shown in dashed lines. The coils 29 are circularly arrayed in equal arc intervals, a coil arc interval being defined as the arcuate interval between centers of adjacent coils on the same armature face, having an included angle of 360°/C, where C is the number of coils on a single face of armature 27. In the embodiment described, 12 coils are arrayed on each face of the disc rotor 28, and each is wound in multiple layers (which may be randomly laid) to achieve a compact, high-density winding for a given armature size and gap width. The winding and overall assembly are thus greatly simplified and, consequently, more durable and reliable. By using fine wire, a great number of turns may be wound in each coil, and a large number of coils may be wound on each of the rotor faces, for example 18, 24, 30 or more, for higher voltage windings and greater efficiency. For higher power machines, thicker wire may be used with a slightly larger air gap, substantially without an offsetting loss in magnetic field strength.

Figure 3:
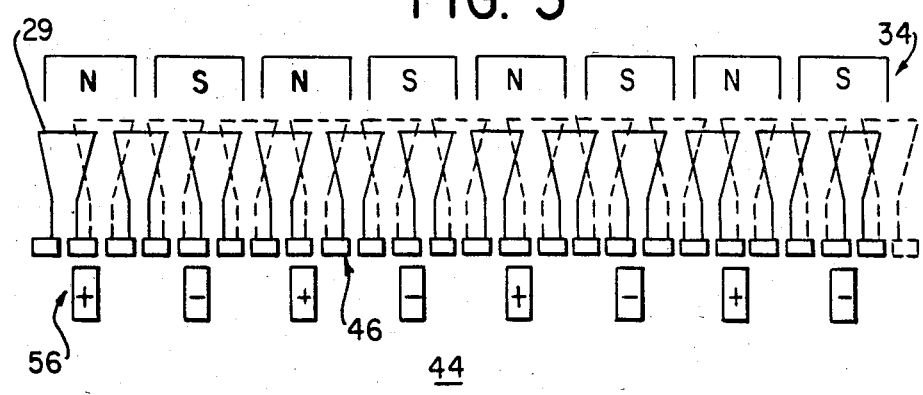
FIG. 3 is a schematic diagram showing a 360° linear development of the coil and pole arrangement of FIG. 2, along with a commutator and brush arrangement according to the invention.

It will be understood that the coils 29 on one rotor face are angularly offset from the coils of the other rotor face. In a preferred embodiment, they are offset by one half-pitch of the coil arc interval. All coils 29 of the armature 27 are connected to a corresponding number of commutator bars 46 in head-to-tail fashion alternatingly from one side of the rotor then the other, as shown in FIG. 2. That is, each coil is wound in the same direction (e.g., clockwise as seen in FIG. 3 going from left to right) and has its ends connected to adjacent commutator bars. Also, each commutator bar has connected to it an end of a coil on one side of the armature and also an end of a coil from the other side of the armature. Thus, the "head" of each coil (i.e., the leftmost end as seen in FIG. 3) on the front face of armature 27 is connected to the "tail" (or rightmost end in FIG. 3) of each coil on the rear face of the armature, and vice-versa. By this arrangement, an even winding and smooth torque characteristics may be achieved.

In the embodiment discussed above, the number P of magnetic field poles in the machine is equal to the number of extremes of flux density (of either polarity) in the gap through which the armature rotates. As defined in this specification, the term "flux density extreme" refers to the maxima and minima (i.e., the crests and valleys) on a graph of flux density versus rotational angle in the air gap (as a circular path is traveled about the axis). It will be appreciated that the maximum and minimum values of flux density in the above-described embodiment occur respectively at the mid-points of the north and south poles, where the north poles have been arbitrarily assigned a positive flux density and the south poles a negative flux density. In such a graph, the maxima (or crests) occur at the greatest positive values of flux density (i.e., the north poles), and the minima (or valleys) occur at the greatest negative values of flux density (i.e., the south poles). As such, the number P of extrema in the embodiment being discussed is equal to the number of magnets 34 on either field member 30 or 32. However, it should be noted that the number P of flux density extrema in other embodiments need not equal the actual number of field poles, as will be seen in the description of FIGS. 4–7 later in this specification.

In the embodiment of FIGS. 1–3, there are more coils on each rotor face than the total number P of field poles in the machine. Thus, if each of field members 30, 32 has P magnets 34 corresponding to the P poles of the machine, where P is an even number greater than 1, then the armature 27 has an array of C coils on each face (or 2C coils in all) where C is any number, odd or even, greater than P. The arcuate extent of each coil is therefore smaller than that of each of the face pieces 70, and each coil, when shorted by a brush when in alignment with a field pole, thus lies within the arcuate extent of the pole's face piece 70, so that no induction occurs in the coil at that position. This results in an absence of arcing at the brushes, longer component life, the possibility of operating the machine at higher speeds, and, therefore, higher efficiency. Further advantages are realized in the connection of the coils with the commutator, as explained further herein.

In a preferred form of the invention, the total number of coils 2C is a multiple of the number P of flux density extremes; i.e., the number of field poles in the above described embodiment. The machine 1 of FIGS. 1 and 2 illustratively has 8 field poles and 24 coils in all, arrayed half on each side of the rotor. In smaller machines, for example, 6 poles may be used with 18 armature coils (9 on each side). For a larger motor, such as for traction, 10 or 12 poles may be used with 30 or 36 coils on the armature (15 or 18 on each side). The multiple number of total coils to poles results in an even winding and smooth torque characteristics.

In this preferred embodiment, all coils have the same number of turns. This is not essential; the coils may have different numbers of turns, although it is preferable that each pair of diametrically opposite coils on the same rotor face should have the same number of turns. Preferably, the wire used for winding has a thermoplastic or resin coating, for example epoxy, such that the turns can be fused together into a unified body. Additionally, the wound coils may be enclosed by a further epoxy layer to produce a durable, smooth, integrated winding structure, reducing windage losses. This arrangement also permits the armature coils to pass very close to the surfaces of the magnet-face pieces 70 on both sides of the armature, thus allowing a greater density of copper winding in the gap between field members 30 and 32, with a resultant increase in horsepower for a given size and corresponding increase in efficiency. The described coreless armature rotor is lightweight and utilizes no iron or ferrite materials, so that there is virtually no armature reaction when used in servo or reversible motors, and no hysteresis effects, eddy losses, or necessity for advancing the commutator brushes under load conditions. Furthermore, the resultant machine may be operated at high rotational speeds for greater horsepower and efficiency.

Turning now to FIG. 3, there is illustrated a schematic diagram of a commutator 44 for use with the armature 27 such as illustrated in FIGS. 1 and 2. The commutator has a number of segments or bars 46 corresponding to the total number of coils 29, 24 segments being used in the described embodiment. The segments 46 are connected to the corresponding coils 29 in head-to-tail fashion as described previously. In FIG. 3, the coils 29 in solid line represent coils on the front armature face of FIG. 2, and those in broken line correspond to coils on the rear armature face shown in dashed lines in FIG. 2. The coils 29 are further shown in relation to the magnets 34 of one of field members 30, 32, and to the commutator brushes 56, here 8 in number corresponding to the number P of field poles. The arrangement serves to maintain 8 parallel conducting paths among the coils and to short each coil as it is moved through a position of alignment with a field pole. This is a simplified construction of high efficiency. It will be understood further that the use of 2C commutator segments with P brushes ensures that a minimum of three commutator segments 46 separate each pair of full-voltage brush contact points. The possibility of shorting and ring-fire due to fragments or particles between segments is thus significantly reduced. Instead of 8 brushes used in the described embodiment, a lesser even number of brushes may be used in light-duty machines in conjunction with bridging corresponding commutator segments with an appropriate series of jumper connections. The jumper connections preferably are in the form of stamped brass rings with insulation cemented to one side and tabs to contact appropriate segments. Such rings may be conveniently pressed in place in order to simplify assembly of the machine.

FIGS. 4–7 illustrate an alternate embodiment 100 of the electromechanical machine 1 described above and illustrated in FIGS. 1–3. Electromechanical machine 100 utilizes a different magnetic field assembly from that discussed above, in conjunction with an armature, commutator and housing structure substantially similar to those shown in FIGS. 1—3. While the following discussion will refer to machine 100 in terms of a DC motor, it is to be understood that the machine may also be operated as a DC generator in a manner well known to those in the art.

Figure 4:
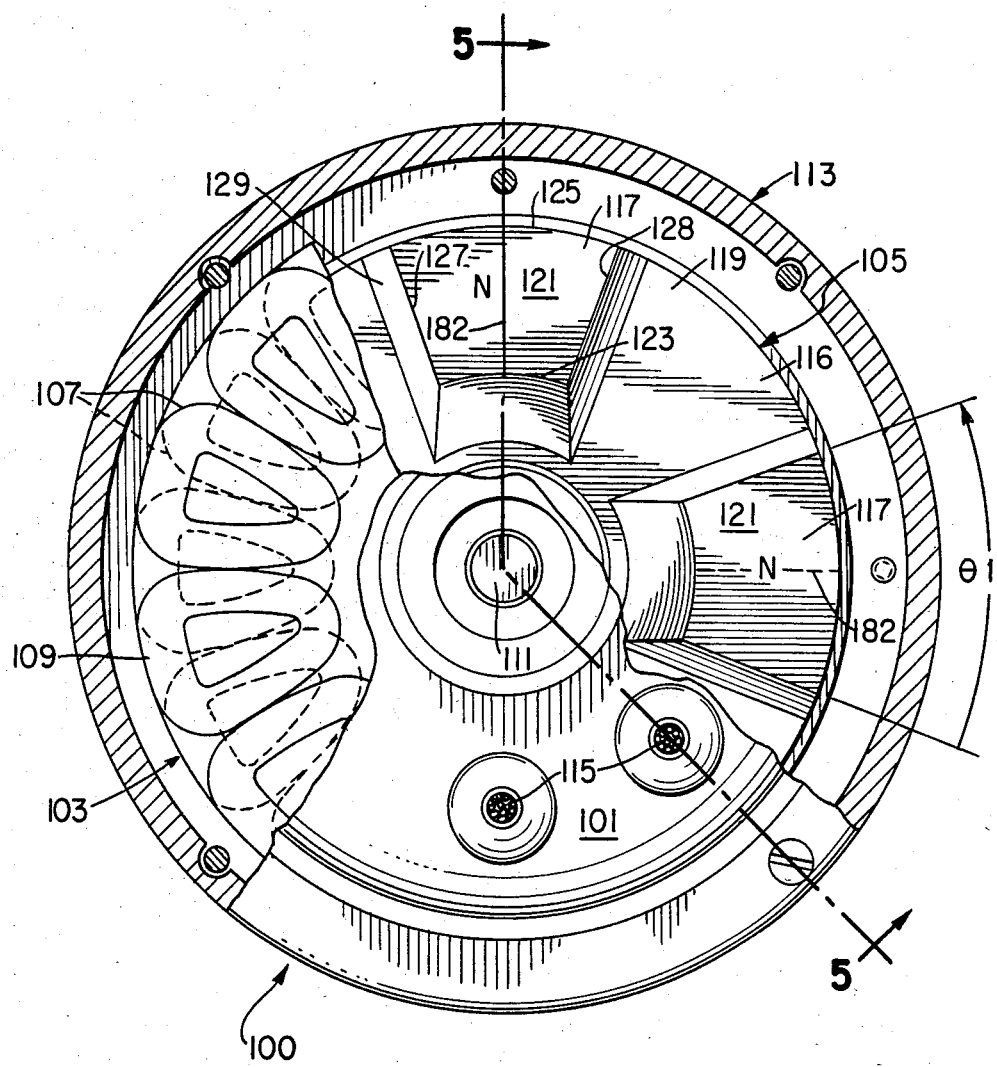
FIG. 4 is an elevational view partly in section of an alternate embodiment of the invention, showing the rear housing of an electromechanical machine with fragmentary views of an armature and flux concentrating member.

FIG. 4 illustrates an elevational view of motor 100, as seen from the rear section 101 of the motor housing, with several sections broken away to illustrate the relationship of armature 103 to the circular first magnetic field member indicated generally at 105. Armature 103 includes a plurality of pie segment shaped coils 107 which may be wound on a non-conducting, non-magnetic disc-shaped rotor 109 as discussed in the previous embodiment. Armature 103 is fixedly secured to, and rotates with shaft 111 inside a motor housing indicated generally at 113. Electrical power is supplied to the armature coils 107 via leads 115 which enter the motor through the rear housing 101.

In a preferred form of motor 100, first field member 105 comprises first flux concentrating member 116 having a a plurality of first salient pole pieces 117 mounted on an annular, disc-shaped supporting plate 119 and disposed in a circular array about shaft 111. Each of the first pole pieces 117 is formed with a flat outer pole face 121 lying in a plane normal to the rotational axis of shaft 111. Outer pole face 121 defines a first pole sector bordered by inner arc 123, outer arc 125 and radial edges 127 and 128, having an arcuate extent measured by angle $\theta_1$. Radially directed sidewalls 129 and inner circumferential sidewall 131 gradually taper from the edges of outer face 121 to a trough region 132 on the face of support plate 119 between adjacent first pole pieces 117. The tapering of sidewalls 129 and 131 helps to create a more desirable flux distribution in the air gap through which armature 103 rotates, as will be discussed in greater detail below. While first flux concentrating member 116 is illustratively shown as having separate first pole pieces 117, each individually fastened to support plate 119 as by a thin layer of elastic cement, flux concentrating member 116 may also be formed from a single block of material, as by milling, to achieved the desired shape.

Turning now to FIG. 5, an axial cross-sectional view of motor 100 is illustrated along section line 5—5 of FIG. 4. Motor housing 113 is formed in three sections, a cup-shaped rear housing section 101, a cylindrical mid-section 133, and a generally annular front section 135, the three sections being suitably fastened together, as by screws 137. The front and rear housing sections 135 and 101 are preferably made of aluminum or other strong, lightweight material. Housing midsection 133 is preferably made of soft iron, steel or other ferromagnetic material, to provide a return path for magnetic flux as described below. Shaft 111 is rotatably supported in housing 113 by front and rear bearings 139 and 141, respectively. Washers 143 may be positioned between the shaft 111 and the front and rear bearings 139 and 141, respectively.

Mounted about shaft 111 is an armature hub indicated generally at 145 which includes front and rear hub sections 147 and 149. The hub sections 147 and 149 are connected to one another, as by screws 151, and are fastened to shaft 111, as by a roll pin 153 passing through front hub section 147 and shaft 111. Suitably secured between the two hub sections 147 and 149 to rotate therewith is annular armature 103 which is constructed in substantially the same manner as armature 27 described above.

Fixedly secured to housing 113 on the front side of armature 103 is a first magnetic field member, indicated generally at 105, which includes an axially magnetized permanent magnet 157 sandwiched between first flux concentrating member 116 and ferromagnetic backing plate 159. Field member 105 is suitably secured to housing 113 as by screws 161, and is preferably symmetrically disposed about and normal to the axis of shaft 111.

Magnet 157 is preferably a one-piece, annular disc of barium or strontium wet-pressed oriented ferrite material, axially magnetized so as to present a uniformly polarized surface on each of its front and rear faces, 163 and 165, respectively. For purposes of illustration, the rear face 165 will be referred to as having north polarity and the front face 163 as having south polarity. These designations are for purposes of convenience only, as the machine will operate equally well with reversed magnetic polarity. The north and south faces 165 and 163 of magnet 157 are respectively fastened to support plate 119 and backing plate 159 as by an elastic cement, the plates 119 and 159 being dimensioned to cover substantially the entire area of the respective magnet faces 165 and 163. First pole pieces 117 are likewise cemented to the rear face 166 of support plate 119 to form the first flux concentrating member 105, although this member may also be formed of a single piece of material, as by milling the appropriate shapes from a solid block of metal.

The axial thickness of backing plate 159 is preferably tapered along a radial path from the periphery of magnet 157 toward the axis of the machine in order to reduce the weight of the plate, since the magnetic flux density in the plate increases proportionally with radial distance from the axis to a maximum point at the outer circumference of magnet 157. The width of the plate 159 and amount of taper are preferably selected to provide a flux density at or near saturation level throughout the plate 159.

The magnet disc 157 described above is preferably a one-piece member, in order to maximize the surface area of the magnet's polar faces. While this construction would not normally be practical due to the frangibility of most magnet materials, the use of annular metal plates 119 and 159 on either side of magnet 157 substantially reduces the likelihood of breaking the magnet under normal operational conditions. Such an arrangement would not be possible with conventional disc motors having alternating sectors of north and south polarity about the magnetic disc face, since the use of an annular ferromagnetic ring between the magnet face and the armature disc would provide a low reluctance path bridging the north and south pole sectors of the magnet, resulting in very little flux crossing the armature coils. However, in the present invention the uniform polarity of magnet face 165 permits the use of a continuous ferromagnetic support plate 119 to reinforce magnet 157 against breakage. Support plate 119 also serves to collect the flux from substantially the entire surface area of the north magnet face 165 and direct that flux through the armature 103 via first pole pieces 117 as discussed in further detail below.

While the preferred magnet disc 157 is a one-piece member, it may be desirable in certain applications to divide the annular magnet structure into a plurality of individual sections, as in the embodiment of FIGS. 1-3, but without alternating the polarities of the individual magnets. Thus, it is to be understood that the term magnet disc, as used in this disclosure, refers to one or more magnets forming a disc-shaped magnet structure, and is not to be construed as limited to the one-piece construction of the preferred embodiment.

A second magnetic field member 166 is mounted on housing 113 in opposed coaxial relation to first field member 105, on the opposite side of armature 103 from first flux concentrating member 116, to provide a return path for flux emanating from magnet 157. In the preferred embodiment, second field member 166 comprises second flux concentrating member 167 which is preferably a one-piece, ferromagnetic structure, mounted on housing 113 between housing mid-section 133 and rear housing section 101, as by screws 169 or the like. Second flux concentrating member 167 is spaced apart from and parallel to first flux concentrating member 116, forming a gap 171 therebetween in which armature 103 may rotate. Thus, magnetic flux emanating from the north pole face 165 of magnet 157 has a low reluctance path through ferromagnetic support plate 119 and through first pole pieces 117 to their outer pole faces 121 bordering gap 171. After the magnetic flux crosses gap 171 in which the armature coils 107 are disposed, the flux returns to the south-polarity face 163 of magnet 157 via ferromagnetic members 167, 133 and 159.

In the discussion above regarding the embodiment of FIGS. 1-3, it was explained that the field members 30 and 32 of that embodiment need not both include permanent magnets 34, so long as the field members cooperate to provide a low reluctance path through which flux may return to its source. FIG. 5 illustrates this case, in which second field member 166 is a ferromagnetic member which returns flux to its source, magnet 157, in the first field member. Conversely, those in the art will appreciate that second field member 166 may have a structure similar to that of first field member 105, in order to enhance the strength of the field poles in gap 171. That is, the second field member may comprise an axially magnetized permanent magnet sandwiched between a flux concentrating member and a ferromagnetic backing plate, the backing plate being mounted to housing midsection 133 to provide a low reluctance flux path linking the north face of one magnet (on the second field member) to the south face of the other magnet (on the first field member).

Fixedly connected to shaft 111 in FIG. 5 and rotating with it is a commutator indicated generally at 173. Commutator 173 is constructed in substantially the same manner as commutator 44 of FIGS. 1-3, having a plurality of brushes 175 delivering electrical power (when the machine acts as a motor) from leads 115 to a plurality of commutator segments 177, which are mounted on shaft 111 for rotation relative to stationary brushes 175. Commutator segments 177 are connected to coils 107 on the front face 179 and the rear face 181 of armature 103, via bridging leads 183, for delivering electrical power to coils 107 with the appropriate polarity to sustain the motor's rotation, as will be further detailed below.

Figure 6:
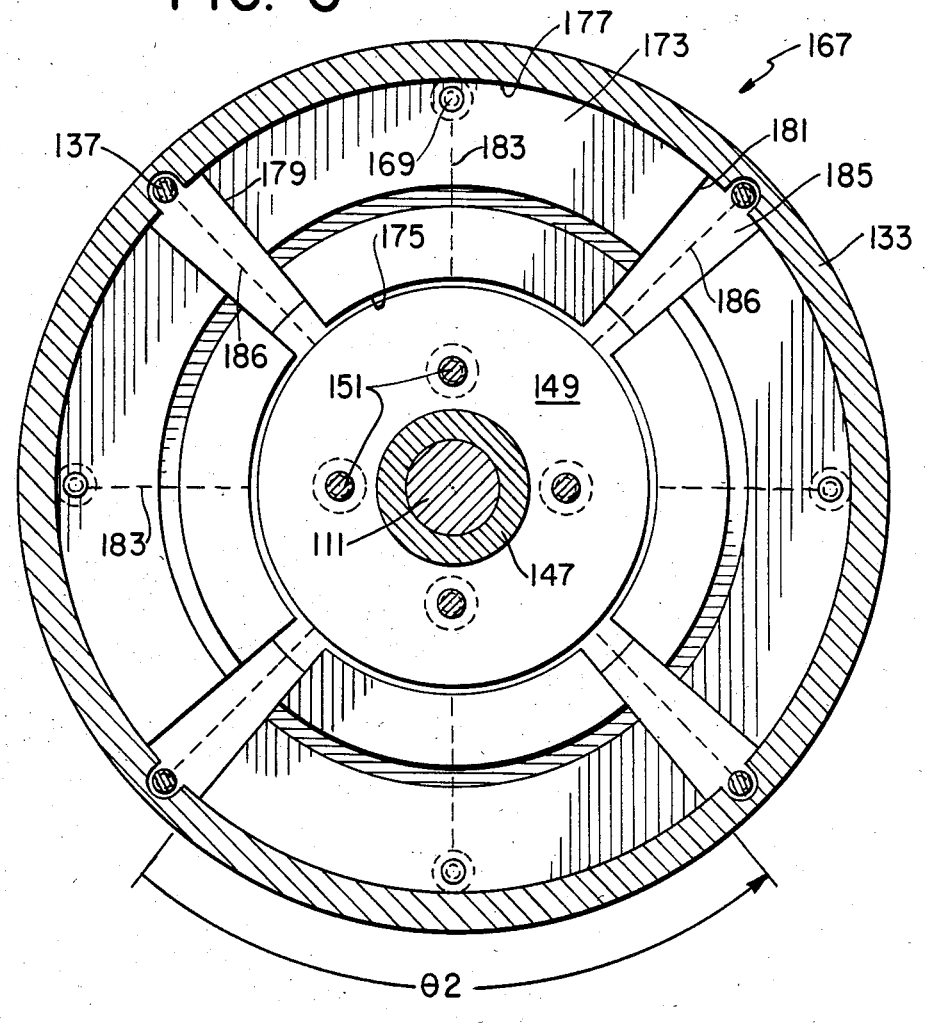
FIG. 6 is a cross-sectional view taken along line 6—6 of FIG. 5.
Figure 7:
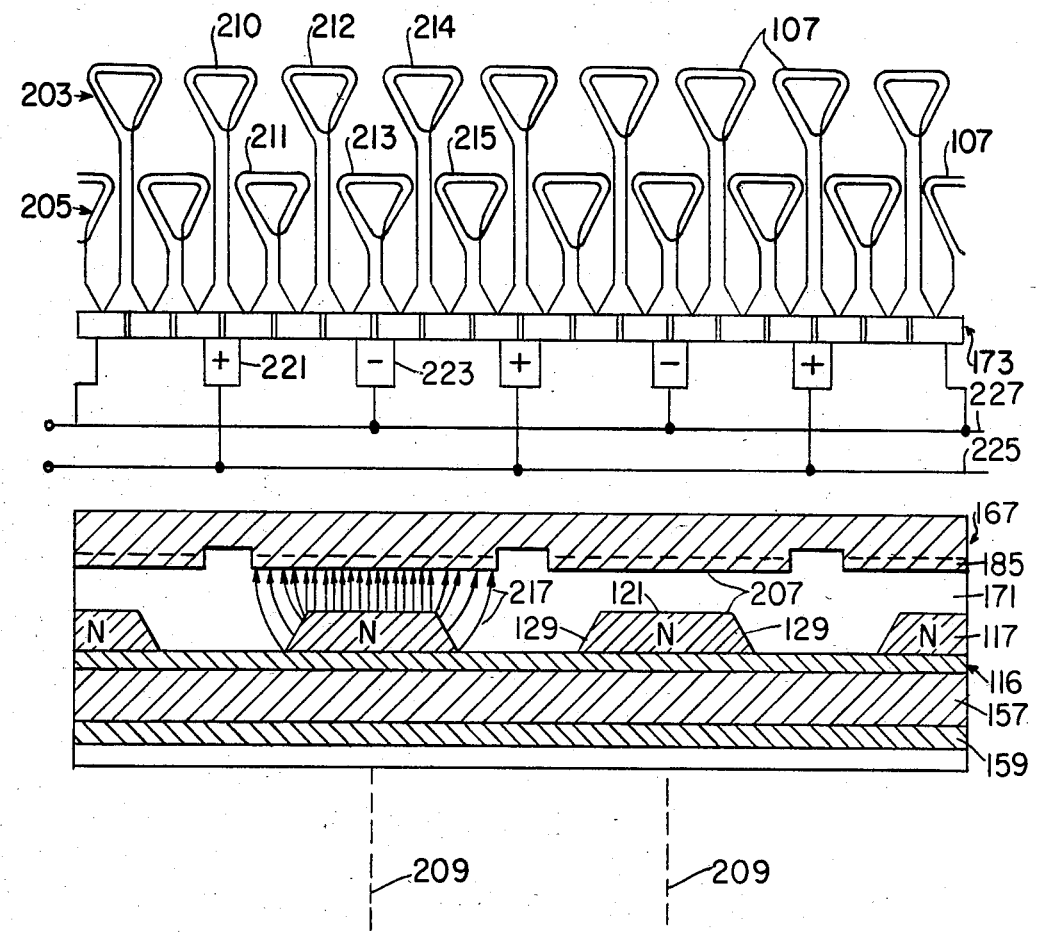
FIG. 7 is a schematic representation showing a 270° linear development of the machine of FIGS. 4–6.

As seen with reference to FIGS. 4, 6, and 7, second flux concentrating member 167 is preferably formed with a plurality of second pole pieces 185, equal in number to the first pole pieces 117 of the first magnetic flux concentrating member 116. Each of second pole pieces 185 describes a second pole sector bordered by inner circumferential arc 187, outer circumferential arc 189 and radial edges 191 and 193. The positions of the two flux concentrating members 115 and 167 relative to each other are fixed so that the arcuate midpoints 195 of each of the first pole pieces 117 (FIG. 4) are aligned across gap 171 from the arcuate midpoints 197 of second pole pieces 185 (FIG. 6). The arcuate extent $\theta_2$ of each second pole piece 185, spanned by radial edges 191 and 193, is preferably substantially greater than the arcuate extent $\theta_1$ of first pole piece 117, spanned by radial edges 127 and 128. This enables each second pole piece to capture stray flux lines from outer face 121 and radial sidewalls 129 of its corresponding first pole piece.

In a preferred embodiment of this form of the invention, the arcuate extent $\theta_1$ of each first pole piece 117 is slightly less than 360°/P (where P equals the total number of flux density extremes, or "effective" poles, being 8 in the embodiment described), and $\theta_2$ is approximately twice the arcuate extent of $\theta_1$.

The preferred second pole arc $\theta_2$ is selected to define a narrow trough region 199 between radial edges 191 and 193 of adjacent second pole pieces 185, so as to provide as little flux density as possible in gap 171 at the trough's arcuate midpoint 201.

It should be noted that the above relationships of the preferred first and second pole arcs $\theta_1$ and $\theta_2$ are recited by way of illustration, and may be modified substantially without detracting from the performance of the motor. The optimum motor performance will be obtained so long as the distribution of flux density in gap 171 is at a maximum level in the vicinity of each pole piece's arcuate midpoint and at a negligible level, ideally zero, in the vicinity of the arcuate midpoints of the troughs between pole pieces; that is, at the arcuate points equidistant between pole piece centers on a field member.

In this form of the invention, a graph of flux density (in the air gap) vs. rotational angle ranges from a positive maximum extreme (at a pole piece's midpoint) to a positive minimum extreme (i.e. a very low positive number, ideally zero), since the direction of flux in the air gap does not reverse as a rotational path is traveled from one pole piece to the next. That is, the minimum extremes of flux density do not correspond to actual field poles as in the previously described embodiments of FIGS. 1–3. However, in operation, the minima of flux density in gap 171 effectively take the place of south field poles in a conventional north/south alternating pole disc motor, even though there is (ideally) no magnetic flux at the "pole". The present embodiment may therefore be thought of as having eight effective poles, since the effect of the field assembly on the coils of armature 103 is substantially similar (although with increased field strength) to that of a conventional 8 pole field assembly (such as the one illustrated in FIGS. 1–3).

FIG. 7 is a schematic diagram illustrating the relative position of coils 107, commutator 173 and flux concentrating members 116 and 167 as seen in a 270-degree development (i.e., an unrolled-cylinder view) of motor 100. In this figure, two horizontal rows or sets of coils 107 are shown, representing respectively the set of coils 203 on the front face 179 of armature 103 (top row in FIG. 7) and the set of coils 205 on the rear face 181 of armature 103 (bottom row). FIG. 7 also illustrates the direction of current flow through coils 107 and the spatial relationship of coil sets 203 and 205 to flux-concentrating members 116 and 167 for a particular position of armature 103, thus showing the interaction of current flow in each of coils 107 with the corresponding flux distribution through the coils.

As seen in FIG. 7, the desired distribution of flux density in gap 171 is provided by the preferred arrangement of first pole pieces 117 and second pole pieces 185. As discussed above, each first pole piece 117 is centrally aligned with a corresponding second pole piece 185 to form a corresponding pole pair indicated generally at 207.

FIG. 7 also shows, in an illustrative manner, the distribution of flux lines in gap 171 between first and second flux concentrating members 116 and 167. As seen in the drawing, the maximum extremes of flux density in gap 171 occur at the arcuate midpoint 209 of each corresponding pole pair 207. The minimum extremes of flux density in gap 171 occur half-way between the arcuate mid-points 209 of adjacent pole pairs 207. This preferred distribution is enhanced by the cooperative shaping of pole pieces 117 and 185 in each corresponding pole pair 207. Each first pole piece 117 is preferably formed with tapered sidewalls 129, creating the trapezoidal cross-sectional shape of the first pole pieces as seen in FIG. 7. The tapering of sidewall 129 helps to direct stray flux lines from the sides of each first pole piece 117 across gap 171 to its corresponding second pole piece 185. Furthermore, the shaping of each of the second pole pieces 185 with a greater arcuate extent $\theta_2$ (FIG. 6) than that of each first pole piece 117 (FIG. 4) is designed to receive flux lines emanating from sidewalls 129 of first pole pieces 117, as seen diagramatically in FIG. 7. The cooperative shaping of corresponding pole pair 207 substantially eliminates the likelihood of stray flux lines traveling from the first pole piece 117 of one pole pair 207 to the second pole piece 185 of an adjacent pole pair. This has the desired effect of confining the flux travel in gap 171 to the regions between corresponding pole pairs 207, thereby providing a negligible level of flux density midway between adjacent pole pairs 207. As a result, the difference between the maximum and minimum extremes of magnetic flux density in gap 171 is maximized, with a corresponding increase in induced e.m.f. as a coil 107 moves from one extreme of flux density to the next.

The induced forces on coils 107 will now be described with reference to the six coils 210 to 215 under the influence of corresponding pole pair 217 in FIG. 7. In the position seen in the drawing, coil 210 is centrally aligned with a point half-way between pole pair 217 and pole pair 219. Since both of the radially directed portions of the coil are experiencing a magnetic field of substantially the same strength and direction, coil 210 will not produce any substantial net rotational force in the position shown. The short-circuiting of coil 210 by brush 221 is therefore desirable to prevent power from being consumed needlessly. Coils 211 and 212 are provided in series between brushes 221 and 223, which are respectively coupled to positive and negative leads 225 and 227, providing a clockwise current flow in each of these two coils. As seen from their position relative to pole pair 217, coils 211 and 212 are both situated in a magnetic field of increasing flux density, going from left to right, which produces a net torque to the right due to both of these coils (assuming a direction of flux travel into the plane of the drawing). Coil 213 is centrally aligned relative to pole pair 217, and is therefore in a field of relatively uniform flux density, which would not contribute to torque. Thus, coil 213 is shorted by brush 223, in a similar manner to the shorting of coil 210 by brush 221, in order to conserve electrical power which would otherwise be drawn by coil 213 without any substantial return in net rotational torque. Coils 214 and 215 are connected in series between negative brush 223 and positive brush 229, providing a counter-clockwise current flow through each of these two coils. Since coils 214 and 215 are in a region of decreasing flux density from left to right (in FIG. 7), a net rotational torque to the right will result from the interaction of magnetic flux and electrical current through these coils. It will thus be seen that the net force on coils 210 to 215 under the influence of pole pair 217 will be from left to right in FIG. 7, with the electrical current through these coils being concentrated on the four coils which are in regions of rapidly changing flux density.

It will be appreciated from the above discussion that the variation in the level of flux density to which a coil 107 is subject as the coil moves from left to right in FIG. 7 has the same periodic cycle as in an eight-pole motor of standard north/south alternating pole construction. That is, the present embodiment alternates between P extremes of flux density about a 360° rotational cycle, and therefore has a cyclic flux density variation equivalent to that found in a conventional motor having P alternating magnetic poles. As discussed above, the regions of minimum flux density in gap 171 are effective in a manner similar to the south poles in a conventional alternating-pole field assembly. Since the motor's torque depends primarily on the amount of difference between extremes of flux density in the air gap, the present embodiment operates most effectively when the flux density at points between two sets of corresponding pole pairs 207 falls as close to zero as possible. This objective is served by the unique shape of first pole pieces 117 and by the use of second pole pieces 185 having a substantially greater arcuate extent than that of the first pole pieces, as discussed above with regard to FIG. 7.

In addition, the maximum flux density in gap 171, which occurs in the vicinity of midpoints 209 of corresponding pole pairs 207, is maximized by the above-described construction of the field assembly in motor 100. So long as the ferromagnetic components of the field structure are proportioned so as to function at or below the flux saturation level of the ferromagnetic material used, the flux from the entire surface of magnet 157 may be channeled through first pole pieces 117. This provides effective utilization of the entire magnet surface area, without any loss of effective magnet surface area due to flux leakage between adjacent north and south poles. The resulting difference between the minimum and maximum extremes of flux density in gap 171 is substantially higher than that which would be obtained with an equivalent magnet disc having alternating north and south polarities. This is particularly important when relatively low-energy magnet materials, such as ferrite-based magnets, are used (as opposed to high-energy alnico or rare earth magnets), in order to maximize the effective magnet surface area obtainable within a given size motor housing. Furthermore, since the effective magnet surface area remains the same regardless of the number of effective poles in the field assembly, due to the absence of flux leakage between adjacent north and south magnets, the number of field poles can be maximized within the practical limits of the commutator design and coil size.

In the foregoing embodiments, the coil-bearing armature has been illustrated as the rotor, while the magnetic field assembly has been illustrated as a stator. It will be understood that, alternatively, the armature may be the stator and the field assembly the rotor, by appropriate mechanical construction. An example of such a structure may be seen in my co-pending patent application Ser. No. 232,810, filed Feb. 9, 1981, the disclosure of which is incorporated herein by reference. It will be equally apparent that the machines described herein may be modified to have any appropriate number of field poles, and may be operated as either a motor or a generator.

Furthermore, the structure of the first and second flux concentrating members 116 and 167, as well as the combination of materials used in their construction, may be varied substantially while still retaining some or all of the advantages of the preferred embodiment. As described above, the function of these members is to provide a low-reluctance path which collects the magnetic flux from substantially the entire surface area of annular magnet face 165 and concentrate that flux in discrete arcuate regions of gap 171 separated by arcuate regions of low (ideally zero) flux density.

For example, a flat second flux-concentrating member (i.e., without second pole pieces 185) may be used for collecting flux emanating from the first flux concentrating member 116. While the absence of second pole pieces may undesirably increase the minimum level of flux density in gap 171, the difference between the minimum and maximum flux density extremes in the gap would still be relatively high as compared with prior designs.

Alternatively, the pole pieces of the first and/or second flux-concentrating members 116 and 167 may be individual permanent magnets, axially polarized in the same polar direction as that of magnet 157, so as to supplement the magnetic flux therefrom. While this arragement would not be as preferable due to the extra cost involved in its construction, it may be advantageous in certain applications where greater field strength is desired in gap 171.

It will also be understood that magnet 157 may be mounted on either the first or second flux-concentrating member, without a substantial change in the performance of the machine, since the magnet's flux is transmitted between the two field members 105 and 166 by a low reluctance path (housing midsection 133). It may also be advantageous to substitute an annular, electromagnetic disc in place of permanent magnet 157, where an electrically generated magnetic field is desired.

While the embodiments herein are directed to machines having a disc-shaped armature, it will be appreciated that many of the inventive features may be easily adapted for use with other types of machines, such as drum-type machines. For example, a drum-shaped or cylindrical armature may be used in which the coils are wound in the plane of the cylindrical surface, the armature coils interacting with a radially directed magnetic field. Such an embodiment could incorporate the advantages of the armature winding scheme and commutator structure discussed above, and may be useful in situations where a disc-type machine is not desirable.

The present invention thus provides a compact, lightweight, high-efficiency electromechanical machine which may be used in a wide range of applications. Such machines can operate at three or more times the speed of laminated armature motors and at $\frac{1}{8}$ to 1/10 the weight. Due to the high ratio of horsepower to weight and the small amount of costly materials required, these machines are also very economical and easy to assemble and produce. Efficiencies of 75 to 80% in smaller machines, and of 85 to 90% and as high as 93% in larger machines, depending on size and speed, are attainable. Furthermore, the elimination of induction in shorted coils and the spacing between commutator brushes ensure long brush life even for operation at high speeds.

It will be understood that the foregoing description of the preferred embodiments of the present invention is for purposes of illustration only, and that the various structural and operational features as herein disclosed are susceptible to a number of modifications and changes none of which entail any departure from the spirit and scope of the present invention as defined in the appended claims.

What is claimed is:
1. An electromechanical machine comprising:
a machine housing;
a field producing assembly mounted in said housing so as to define an air gap circumferentially disposed about an axis of rotation, for producing a distribution of magnetic flux in said gap having P periodic extremes of flux density about said axis;
an armature disposed in said gap, said armature and field assembly being mounted for relative rotation, said armature having a circular array of C non- overlapping coils on each of a front and back free thereof, C being an integer greater than P, each coil of the coil array on one armature face being angularly offset about said axis relative to a coil of the coil array on the other armature face by an amount less than 360°/C, each coil of each armature face having the same arcuate extent, said arcuate extent being less than 360°/P.

2. An electromechanical machine as in claim 1, further including switching means for short circuiting each coil when its center is aligned with an extreme of magnetic flux density in said gap, while enabling current flow through all other coils which are not so aligned.

3. An eletromechanical machine as in claim 1, wherein said coils of the armature faces are electrically connected to each other in head-to-tail fashion with each coil of one armature face connected directly to a coil of the other armature face.

4. An electromechanical machine as in claim 3, further including:
a commutator mounted non-rotatably with respect to the armature and rotatably with respect to the field assembly, said commutator having a plurality of commutator segments each coupled to a respective end of one of said one-face coils and also to a respective end of one of said other-face coils, and
P brushes engaging said commutator, said brushes being interconnected to provide P parallel conducting pathways among said coils of the armature faces and for shorting P coils when each of said P coils is centrally aligned with one of said extremes of magnetic flux density in said gap.

5. An electromechanical machine as in any of claims 1 or 3 further comprising:
a commutator mounted so as to be non-rotatable with respect to the armature and rotatable with respect to the field assembly, said commutator having 2C conductive and electrically isolated commutator segments spaced in a substantially circular arrangement, each of said coils being connected between a pair of adjacent commutator segments;
P brushes positioned in spaced arrangement so as to contact each of said commutator segments in turn during operation of said machine, each of said brushes being dimensioned to be wider than the non-conductive region between adjacent commutator segments, each of said brushes being positioned with respect to a corresponding one of said extremes of magnetic flux density so that the pair of commutator segments corresponding to a single coil are shortcircuited by said brush when said coil is centrally aligned with a corresponding flux density extreme in said gap.

6. An electromechanical machine as in claim 5 wherein said field assembly further comprises first and second magnetic field members disposed about a common axis and spaced axially apart to form a gap therebetween, at least one of said field members comprising a magnet structure for providing an axially directed flux field across said gap distributed to provide a circular array of perodic extremes of magnetic flux density.

7. An electromechanical machine as in claim 1, including a commutator mounted non-rotatably with respect to said armature and rotatably with respect to said field assembly.

8. An electromechanical machine as in claim 7, further including P brushes engaging said commutator, said brushes being interconnected to provide P parallel conducting pathways among the coils of the armature and for shorting P coils when each of said P coils is centrally aligned with one of said extremes of magnetic flux density in said gap.

9. An electromechanical machine as in claim 7, wherein each coil is connected between two adjacent segments of said commutator.

10. An electromechanical machine comprising:
first and second magnetic field members spaced apart to form a gap therebetween, each member having a circular array of P magnetic pole faces of alternately opposite polarity bordering said gap, P being an even integer, each pole face of each field member spanning substantially the same pole arc and being aligned opposite an opposite-polarity pole face of the other field member;
an armature coaxial with and disposed in said gap between said field members, and mounted to rotation relative thereto, said armature having a circulat array of C non-overlapping coils on each of a front and back face thereof, C being an integer greater than P, each coil of the coil array on one armature face being angularly offset relative to a coil of the coil array on the other armature face by an amount less than 360°/C, each coil of each armature face spanning substantially the same coil arc smaller than said pole arc; and
a commutator mounted so as to be non-rotatable with respect to the armature and rotatable with respect to the field members.

11. An electromechanical machine as in claim 10, wherein said commutator has segments, and said coils of the armature faces are electrically connected in head-to-tail fashion with each coil of one armature face connected directly to a coil of the other armature face and to a respective one of the commutator segments.

12. The electromechanical machine according to claim 11 wherein C is an integer such that C multiplied by 2 is a multiple of P.

13. The electromechanical machine according to claim 12, further comprising switching means including P brushes in conjunction with the commutator for maintaining P parallel conducting pathways among the coils of the armature faces and for shorting P coils upon the relative rotation bringing said P coils into positions of alignment with the pole faces of the field members.

14. The electromechanical machine according to claim 10, further comprising switching means including P brushes in conjunction with the commutator for maintaining P parallel conducting pathways among the coils of the armature faces and for shorting P coils upon the relative rotation bringing said P coils into positions of alignment with the pole faces of the field members.

15. The electromechanical machine according to any one of claims 13 or 14 wherein said switching means comprises:
2C conductive and electrically isolated commutator segments spaced in a substantially circular arrangement on said commutator, each of said coils being connected between a pair of adjacent commutator segments;
P brushes positioned in spaced arrangement so as to contact each of said commutator segments in turn during operation of said machine, each of said brushes being dimensioned to be wider than the spacing between adjacent commutator segments, each of said brushes being positioned with respect to a corresponding pole face so that the pair of commutator segments corresponding to a single coil are short circuited by said brush as said coil and the corresponding pole face are relatively rotated into a position of alignment; and said coils being in series circuit between adjacent brushes, the circuits between adjacent brushes forming the P parallel conducting pathways.

16. An electromechanical machine comprising:

first and second stator members spaced apart to form a gap therebetween, each having a circular array of P magnetic pole faces of alternately opposite polarity, P being an even integer, each pole face of each stator member spanning substantially the same pole arc and being aligned opposite an opposite-polarity pole face of the other stator member, an armature rotor between the stator members having a circular array of C non-overlapping coils on each of a front and back face thereof, C being an integer greater than P, each coil of the coil array on one rotor face being angularly offset relative to a coil of the coil array on the other rotor face by an amount less than 360°/C, each coil of each rotor face spanning substantially the same coil arc smaller than said pole arc.

17. The electromechanical machine according to claim 16, wherein C is an integer such that 2C is a multiple of P.

18. An electromechanical machine as in claim 16, further comprising a commutator rotatable with the rotor, the commutator having 2C segments, the 2C coils of the rotor faces being connected to each other in head-to-tail fashion with each coil of one rotor face connected directly to a coil of the other rotor face and to a respective one of said 2C commutator segments.

19. The electromechanical machine according to claim 18, wherein C is an integer such that 2C is a multiple of P.

20. The electromechanical machine according to claim 19, further comprising switching means including P brushes in conjunction with the commutator for maintaining P parallel conducting pathways among the 2C coils and for shorting P coils upon rotation into positions of alignment with the pole faces of the stator members.

21. The electromechanical machine according to claim 16, further comprising switching means in conjunction with the commutator for maintaining P parallel conducting pathways among the 2C coils and for shorting the coils upon rotation into positions of alignment with the pole faces of the stator members.

22. The electromechanical machine according to any one of claims 20 or 21 wherein said switching means comprises:

2C conductive and electrically isolated commutator segments spaced apart in a substantially circular arrangement on said commutator, each of said coils being connected between a pair of adjacent commutator segments;

P brushes positioned in spaced arrangement so as to contact each of said commutator segments in turn during operation of said machine, each of said brushes being dimensioned to the wider than the spacing between adjacent commutator segments, each of said brushes being positioned with respect to a corresponding pole face so that the pair of commutator segments corresponding to a single coil are short circuited by said brush as said coil is rotated into a position of alignment with respect to the corresponding pole face, said coils being in series circuit between adjacent brushes, the circuits between adjacent brushes forming P parallel conducting pathways.

23. The electromechanical machine according to claim 16, wherein the coils are each wound with wire in the same direction in random multiple layers.

24. The electromechanical machine according to claim 23, wherein the wire is coated with a thermoplastic or resin material, and each coil is fused into a unified body.

25. The electromechanical machine according to claim 16, wherein the coil arrays on the rotor faces are enclosed in a protective layer of thermoplastic or resin material.

26. The electromechanical machine according to claim 16, wherein the stator members are flat, circular, and spaced apart parallel to each other, each member including a backing plate and further comprising a plurality of P permanent magnets arranged in a circular array on the backing plate, each of the magnets occupying a pie-segment shaped arc sector with a relatively small separation between it and adjacent magnets, and further wherein the rotor is a disc rotatable in the gap between the spaced apart parallel stator members.

27. The electromechanical machine according to claim 16, wherein each of the array of pie-segment shaped magnets is a ceramic ferrite permanent magnet having on an outward face thereof a ferromagnetic face piece facing the coils on the rotor.

28. The electromechanical machine according to claim 27, wherein said face piece is tapered such that its area facing the coils is smaller than the arc sector area of the underlying magnet but its width in a circumferential sense matches that of the underlying magnet.

29. An electromechanical machine comprising:

a magnet structure having an annular face for producing a unidirectional magnetic field directed along the axis of said annular face, said field having uniform polarity over all of said face;

first and second magnetic flux concentrating members coaxial with said annular face and spaced axially apart to form a gap between said flux concentrating members, said magnet structure being juxtaposed to one of said flux concentrating members on the side of said one member opposite from said gap;

said one flux concentrating member comprising a ferromagnetic member substantially conforming to the peripheral size and shape of said annular face of said magnet structure;

at least one of said flux concentrating members having a plurality of salient pole pieces arranged in a circular array about said axis and extending axially toward the other one of said flux concentrating members, for defining a corresponding plurality of high flux density regions in said gap, and an armature interposed between said first and second members in said gap, and comprising a plurality of coils arranged in a circular array about said axis.

30. An electromechanical machine as in claim 29, wherein said armature comprises an annular disc with said coils wound substantially in the plane of said disc.

31. An electromechanical machine as in claim 30, wherein said magnet structure comprises a permanent magnet structure in the shape of an annular disc, said structure being axially magnetized so that the two annular faces thereof are oppositely polarized, each face having a uniform magnetic polarity.

32. An electromechanical machine as in claim 31, wherein said permanent magnet structure comprises a permanently magnetized, ferrite-based magnet material.

33. An electromechanical machine as in claim 29, wherein said first flux concentrating member comprises a plurality of discrete first salient pole pieces arranged in a circular array about said axis and extending axially toward said second flux concentrating member to provide a first plurality of pole faces of like polarity, and said second flux concentrating member comprises a plurality of second salient pole pieces arranged in a circular array about said axis and extending axially toward said first flux concentrating member to provide a second plurality of pole faces of like polarity, each of said first pole pieces being fixedly aligned across said gap with a corresponding second pole piece and defining a region of maximum flux density therebetween.

34. An electromechanical machine as in claim 33, wherein adjacent first pole pieces are separated by a trough region of said first concentrating path member, and each of said first pole pieces has a circumferentially tapered side wall extending over at least a portion of the arc sector between its arcuate midpoint and the midpoint of an adjacent trough.

35. An electromechanical machine as in claim 34, wherein each of said first pole pieces has a substantially trapezoidal shape as seen along a cylindrical cross-section about said axis.

36. An electromechanical machine as in claim 34, wherein the pole arc spanned by each of said second pole pieces is substantially greater than that of said first pole pieces.

37. An electromechanical machine as in claim 35, wherein the pole arc spanned by said second pole pieces is substantially greater than that of said first pole pieces.

38. An electromechanical machine as in claim 37, wherein the shape of each of said second pole pieces along a cylindrical cross-section about said axis is substantially rectangular.

39. An electromechanical machine as in claim 38, wherein said circular array of second pole pieces has at least one circular groove about said axis and bordering said gap.

40. An electromechanical machine as in claim 29, wherein said first flux concentrating member comprises a ferromagnetic structure in which said first pole pieces are disposed about an annular supporting member, and said second flux concentrating member comprises a ferromagnetic structure in which said second pole pieces are disposed about an annular supporting member.

41. An electromechanical machine as in any of claims 36, 37 or 38, wherein said armature comprises an annular disc with said coils wound substantially in the plane of said disc.

42. An electromechanical machine as in claim 41, wherein said magnet structure comprises a permanent magnet structure in the shape of an annular disc, said structure being axially magnetized so that the two annular faces thereof are oppositely polarized, each face having a uniform magnetic polarity.

43. An electromechanical machine as in claim 42, wherein said permanent magnet structure comprises a permanently magnetized, ferrite-based material.

44. An electromechanical machine as in claim 29, wherein said first and second flux concentrating members provide a circular array of P equally spaced extremes of magnetic flux density in said gap, said armature comprising an annular disc having a circular array of C non-overlapping coils on each of a front and a back face thereof, C being an integer greater than P, the coil array on one armature face being angularly offset relative to the coil array on the other armature face, each coil of each armature face having the same arcuate extent smaller than 360°/P; and said electromechanical machine further comprising means for switching the direction of electrical current through each of said coils according to the angular position of said coil relative to said flux concentrating members.

45. An electromechanical machine as in claim 44, wherein said switching means further comprises means for short circuiting each coil when its center is aligned with an extreme of magnetic flux density in said gap, while enabling current flow through all other coils which are not so aligned.

46. An electromechanical machine as in claim 44, wherein said 2C coils of the armature faces are electrically connected to each other in head-to-tail fashion with each coil of one armature face connected directly to a coil of the other armature face, and said switching means comprising a commutator mounted non-rotatably with respect to the armature and rotatably with respect to the field members, said commutator having a plurality of commutator segments each coupled to a respective end of one of said one-face coils and also to a respective end of one of said other-face coils, and P brushes engaging said commutator, said brushes being interconnected to provide P parallel conducting pathways among said 2C coils and for shorting P coils when each of said P coils is centrally aligned with one of said extremes of magnetic flux density in said gap.

47. An electromechanical machine as in claim 44, further comprising:

a commutator mounted so as to be non-rotatable with respect to the armature and rotatable with respect to the field members, said commutator having 2C conductive and electrically isolated commutator segments spaced in a substantially circular arrangement, each of said coils being connected between a pair of adjacent commutator segments;

P brushes positioned in spaced arrangement so as to contact each of said commutator segments in turn during operation of said machine, each of said brushes being dimensioned to be wider than the non-conductive region between adjacent commutator segments, each of said brushes being positioned with respect to a corresponding one of said extremes of magnetic flux density so that the pair of commutator segments corresponding to a single coil are short circuited by said brush when said coil is centrally aligned with a corresponding extreme of flux density in said gap.

48. An electromechanical machine as in claim 47, wherein said coils are in series circuit between adjacent brushes, the circuits between adjacent brushes forming P parallel conducting pathways.

49. An electromechanical machine as in claim 43, wherein said armature has a circular array of C non-overlapping coils on each of a front and back face thereof, C being an integer greater than P, the coil array on one armature face being angularly offset relative to the coil array on the other armature face, each coil of each armature face having the same arcuate extent smaller than 360°/P.

50. An electromechanical machine as in claim 49, further comprising:
   a commutator mounted so as to be non-rotatable with respect to the armature and rotatable with respect to the field members, said commutator having 2C conductive and electrically isolated commutator segments spaced in a substantially circular arrangement, each of said coils being connected between a pair of adjacent commutator segments;
   P brushes positioned in spaced arrangement so as to contact each of said commutator segments in turn during operation of said machine, each of said brushes being dimensioned to be wider than the non-conductive region between adjacent commutator segments, each of said brushes being positioned with respect to a corresponding one of said extremes of magnetic flux density so that the pair of commutator segments corresponding to a single coil are short circuited by said brush when said coil is centrally aligned with a corresponding extreme of flux density in said gap; and
   said coils being in series circuit between adjacent brushes, the circuits between adjacent brushes forming P parallel conducting pathways.

51. An electromechanical machine comprising:
   first and second magnetic flux concentrating members coaxially disposed about a rotational axis and spaced apart to form a gap therebetween;
   said first flux concentrating member having a plurality of first salient pole pieces of like magnetic polarity arranged in a circular array about said axis and extending axially toward said second flux concentrating member, each pole piece defining a region of maximum magnetic flux density in said gap at the pole piece's arcuate midpoint;
   said first flux concentrating member having a trough between each adjacent pair of said first pole pieces, each trough defining a region of minimum flux density in said gap at the trough's arcuate midpoint;
   said first pole pieces each having a circumferentially tapered side wall extending over at least a protion of the arc sector between its midpoint and the midpoints of its adjacent troughs to reduce the level of stray flux lines from said side walls in the vicinity of said troughs' arcuate midpoints, and
   an armature interposed between said first and second flux concentrating members in said gap, said armature and said flux concentrating members being mounted for relative rotation, said armature comprising a plurality of coils arranged in a circular array about said axis.

52. An electromechanical machine as in claim 51, wherein said first flux concentrating member comprises a ferromagnetic member including said first salient pole pieces disposed about an annular supporting member, and
   said electromechanical machine further comprises a magnet structure having an annular face for producing a unidirectional magnetic field directed along the axis of said annular face, said field having uniform polarity over all of said face, said magnet structure being juxtaposed to one of said magnetic flux concentrating members on the side of said one member opposite from said gap.

53. An electromechanical machine as in claim 52, wherein said first flux concentrating member comprises a plurality of discrete first salient pole pieces arranged in a circular array about said axis and extending axially toward said second flux concentrating member to provide a first plurality of pole faces of like polarity, and
   said second flux concentrating member comprises a plurality of second salient pole pieces arranged in a circular array about said axis and extending axially toward said first flux concentrating member to provide a second plurality of pole faces of like polarity, each of said first pole pieces being fixedly aligned across said gap with a corresponding second pole piece and defining a region of maximum flux density therebetween.

54. An electromechanical machine as in claim 53, wherein said first flux concentrating member comprises a ferromagnetic member having said first pole pieces disposed about an annular supporting member.

55. An electromechanical machine as in claim 54, wherein the arcuate extent of said second pole pieces is substantially greater than that of said first pole pieces.

56. An electromechanical machine as in claim 55, wherein said armature has a circular array of C non-overlapping coils on each of a front and back face thereof, C being an integer greater than P, the coil array on one armature face being angularly offset relative to the coil array on the other armature face, each coil of each armature face having the same arcuate extent smaller than 360°/P.

57. An electromechanical machine as in claim 56, further including switching means for short circuiting each coil when its center is aligned with an extreme of magnetic flux density in said gap, while enabling current flow through all other coils which are no so aligned.

58. An electromechanical machine as in claim 57, wherein said switching means comprises:
   a commutator mounted so as to be non-rotatable with respect to the armature and rotatable with respect to the field members, said commutator having 2C conductive and electrically isolated commutator segments spaced in a substantially circular arrangement, each of said coils being connected between a pair of adjacent commutator segments;
   P brushes positioned in spaced arrangment so as to contact each of said commutator segments in turn during operation of said machine, each of said brushes being dimensioned to be wider than the non-conductive region between adjacent commutator segments, each of said brushes being positioned with respect to a corresponding one of said extremes of magnetic flux density so that the pair of commutator segments corresponding to a single coil are short circuited by said brush when said coil is centrally aligned with a corresponding flux density extreme in said gap, and
   said coils being in series circuit between adjacent brushes, the circuits between adjacent brushes forming P parallel conducting pathways.

59. An electromechanical machine as in claim 58, wherein said brushes are spaced apart a distance of at least three commutator segments.

60. An electromechanical machine comprising:

first and second magnetic flux concentrating members coaxially disposed about a rotational axis and spaced apart to form a gap therebetween;

said first flux concentrating member comprising a plurality of first salient pole pieces in a circular array about said axis, each of said first pole pieces having the same magnetic polarity and spanning a first pole arc in a plane normal to said axis;

said second flux concentrating member comprising a plurality of second salient pole pieces in a circular array about said axis, each of said second pole pieces corresponding to and axially aligned across said gap from one of said first pole pieces;

each of said second pole pieces having the same magnetic polarity, opposite from that of said first pole pieces, and occupying a second pole arc relative to a plane normal to said axis, said second pole arc being substantially greater than said first pole arc, so as to substantially confine the magnetic flux in said gap between corresponding first and second pole pieces, and an armature interposed between said first and second flux concentrating members in said gap, said armature and flux concentrating members being coaxially mounted for relative rotation, said armature comprising a plurality of coils arranged in a circular array about said axis.

61. An electromechanical machine as in claim 60, further comprising a magnet structure having an annular face for producing a unidirectional magnetic field directed along the axis of said annular face, said field having uniform polarity over all of said face; and said magnet structure being juxtaposed to one of said magnetic flux concentrating members on the side of said one member opposite from said gap.

62. An electromechanical machine as in claim 61, wherein said first flux concentrating member comprises a ferromagnetic structure in which said first pole pieces are disposed about an annular supporting member, and said second flux concentrating member comprises a ferromagnetic structure in which said second pole pieces are disposed about an annular supporting member.

63. An electromechanical machine as in claim 62 wherein said armature has a circular array of C non-overlapping coils on each of a front and back face thereof, C being an integer greater than P, the coil array on one armature face being angularly offset relative to the coil array on the other armature face, each coil of each armature face having the same arcuate extent smaller than 360°/P.

64. An electromechanical machine as in claim 63, further including switching means for short circuiting each coil when its center is aligned with an extreme of magnetic flux density in said gap, while enabling current flow through all other coils which are not so aligned.

65. An electromechanical machine as in claim 64, wherein said switching means comprises:

a commutator mounted so as to be non-rotatable with respect to the armature and rotatable with respect to the field members, said commutator having 2C conductive and electrically isolated commutator segments spaced in a substantially circular arrangement, each of said coils being connected between a pair of adjacent commutator segments;

P brushes positioned in spaced arrangement so as to contact each of said commutator segments in turn during operation of said machine, each of said brushes being dimensioned to be wider than the non-conductive region between adjacent commutator segments, each of said brushes being positioned with respect to a corresponding one of said flux density extremes so that the pair of commutator segments corresponding to a single coil are short circuited by said brush when said coil is centrally aligned with a corresponding flux density extreme in said gap; and said coils being in series circuit between adjacent brushes, the circuits between adjacent brushes forming P parallel conducting pathways.

66. An electromechanical machine as in claim 65, wherein said brushes are spaced apart a distance of at least three commutator segments.

67. An electromechanical machine as in claim 29, wherein said ferromagnetic member is a continuous annular support plate interposed between the magnet structure and the pole pieces of said one flux concentrating member.

68. An electromechanical machine comprising:

a machine housing;

a field producing assembly mounted in said housing so as to define an air gap circumferentially disposed about an axis of rotation, for producing a distribution of magnetic flux in said gap having P periodic extremes of flux density about said axis;

an armature disposed in said gap, said armature and field assembly being mounted for relative rotation, said armature having a circular array of C non-overlapping coils on each of a front and back face thereof, C being an integer greater than P, the coil array on one armature face being angularly offset relative to the coil array on the other armature face, each coil of each armature face having the same arcuate extent, said arcuate extent being less than 360°/P;

a commutator mounted non-rotatably with respect to said armature and rotatably with respect to said field assembly; and P brushes engaging said commutator, said brushes being interconnected to provide P parallel conducting pathways among the coils of the armature faces and for shorting P coils when each of said P coils is centrally aligned with one of said extremes of magnetic flux density in said gap, said brushes being spaced apart a distance of at least three commutator segments.

69. An electromechanical machine as defined by claim 68, wherein said commutator includes 2C conductive and electrically isolated commutator segments spaced in a substantially circular arrangement, each of said coils being connected between a pair of adjacent commutator segments; and wherein said P brushes are positioned in spaced arrangement so as to contact each of said commutator segments in turn during operation of said machine, each of said brushes being dimensioned to be wider than the non-conductive region between adjacent commutator segments, each of said brushes being positioned with respect to a corresponding one of said extremes of magnetic flux density so that the pair of commutator segments corresponding to a single coil are shortcircuited by said brush when said coil is centrally aligned with a corresponding flux density extreme in said gap.

70. An electromechanical machine as defined by claim 69 wherein said field assembly further comprises first and second magnetic field members disposed about a common axis and spaced axially apart to form a gap therebetween, at least one of said field members comprising a magnetic structure for providing an axially directed flux field across said gap distributed to provide a circular array of periodic extremes of magnetic flux density.

71. An electromechanical machine comprising:
first and second magnetic field members spaced apart to form a gap therebetween, each member having a circular array of P magnetic pole faces of alternately opposite polarity bordering said gap, P being an even integer, each pole face of each field member spanning substantially the same pole arc and being aligned opposite an opposite-polarity pole face of the other field member; and
an armature coaxial with and disposed in said gap between field members, and mounted for rotation relative thereto, said armature having a circular array of C non-overlapping coils on each of a front and back free thereof, C being an integer greater than P, the coil array on one armature face being angularly offset relative to the coil array on the other armature face, each coil of each armature face spanning substantially the same coil arc smaller than said pole arc;
a commutator mounted so as to be non-rotatable with respect to the armature and rotatable with respect to the field members, said commutator including 2C segments, and said coils of the armature faces being electrically connected in head-to-tail fashion with each coil of one armature face connected directly to a coil of the other armature face and to a respective one of the 2C commutator segments, each commutator segment being separated from its adjacent segments by a non-conductive region; and
switching means including brushes arranged in relation to the 2C commutator segments such that the brushes are spaced apart a distance of at least three commutator segments.

72. An electromechanical machine as defined by claim 71, wherein said switching means comprises:
2C conductive and electrically isolated commutator segments spaced in a substantially circular arrangement on said commutator, each of said coils being connected between a pair of adjacent commutator segments;
P brushes positioned in spaced arrangement so as to contact each of said commutator segments in turn during operation of said machine, each of said brushes being dimensioned to be wider than the spacing between adjacent commutator segments, each of said brushes being positioned with respect to a corresponding pole face so that the pair of commutator segments corresponding to a single coil are shortcircuited by said brush as said coil and the corresponding pole face are relatively rotated into a position of alignment; and
said coils being in series circuit between adjacent brushes, the circuits between adjacent brushes forming the P parallel conducting pathways.

73. An electromechanical machine comprising:
first and second stator members spaced apart to form a gap therebetween, each having a circular array of P magnetic pole faces of alternately opposite polarity, P being an even integer, each pole face of each stator member spanning substantially the same pole arc and being aligned opposite an opposite-polarity pole face of the other stator member,
an armature rotor between the stator members having a circular array of C non-overlapping coils on each of a front and back face thereof, C being an integer greater than P, the coil array on one rotor face being angularly offset relative to the coil array on the other rotor face, each coil of each rotor face spanning substantially the same coil arc smaller than said pole arc,
a commutator rotatable with the rotor, the commutator having 2C segments, the coils of the rotor faces being connected to each other in head-to-tail fashion with each coil of one rotor face connected directly to a coil of the other rotor face and to a respective one of said 2C commutator segments, and
switching means including brushes arranged in relation to the 2C commutator segments such that adjacent brushes are spaced apart a distance of at least three commutator segments.

74. An electromechanical machine as defined by claim 73, wherein said switching means comprises:
2C conductive and electrically isolated commutator segments spaced apart in a substantially circular arrangement on said commutator, each of said coils being connected between a pair of adjacent commutator segments;
P brushes positioned in spaced arrangement so as to contact each of said commutator segments in turn during operation of said machine, each of said brushes being dimensioned to be wider than the spacing between adjacent commutator segments, each of said brushes being positioned with respect to a corresponding pole face so that the pair of commutator segments corresponding to a single coil are short circuited by said brush as said coil is rotated into a position of alignment with respect to the corresponding pole face, said coils being in series circuit between adjacent brushes, the circuits between adjacent brushes forming P parallel conducting pathways.

* * * * *